(12) United States Patent
Sakurai et al.

(10) Patent No.: US 10,059,630 B2
(45) Date of Patent: Aug. 28, 2018

(54) DIELECTRIC CERAMIC COMPOSITION AND MULTILAYER CERAMIC CAPACITOR

(71) Applicant: TDK CORPORATION, Tokyo (JP)

(72) Inventors: Dan Sakurai, Tokyo (JP); Nobuto Morigasaki, Tokyo (JP); Tatsuya Ishii, Tokyo (JP); Takuma Ariizumi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/466,247

(22) Filed: Mar. 22, 2017

(65) Prior Publication Data

US 2017/0283328 A1 Oct. 5, 2017

(30) Foreign Application Priority Data

Mar. 30, 2016 (JP) .................. 2016-068780

(51) Int. Cl.
*C04B 35/49* (2006.01)
*C04B 35/468* (2006.01)
(Continued)

(52) U.S. Cl.
CPC .......... *C04B 35/49* (2013.01); *C04B 35/6261* (2013.01); *C04B 35/64* (2013.01);
(Continued)

(58) Field of Classification Search
CPC .... C04B 35/4682; C04B 35/49; H01G 4/1245
See application file for complete search history.

(56) References Cited

U.S. PATENT DOCUMENTS

| 8,008,222 B2 * | 8/2011 | Shibasaki | ........... C04B 35/4682 361/321.4 |
| 2010/0029464 A1 * | 2/2010 | Shibasaki | ........... C04B 35/4682 501/139 |

(Continued)

FOREIGN PATENT DOCUMENTS

JP      H08-31232 A      2/1996

*Primary Examiner* — Karl E Group
(74) *Attorney, Agent, or Firm* — Oliff PLC (57) ABSTRACT

The object of the present invention is to provide the dielectric ceramic composition having good characteristics even under the high electric field intensity, and particularly good IR characteristic and the high temperature accelerated lifetime. The dielectric ceramic composition according to the present invention comprises a main component comprising a perovskite type compound shown by a compositional formula $(Ba_{1-x-y}Sr_xCa_y)_m(Ti_{1-z}Zr_z)O_3$ (note that, said "m", "x", "y" and "z" all show a mol ratio, and each satisfies $0.94 \leq m \leq 1.1$, $0 \leq x \leq 0.2$, $0 \leq y \leq 0.2$, $0.06 \leq z < 0.2$), a first sub component comprising oxides of a rare earth element R (note that, R is any one selected from the group consisting of Sc, Y, La, Ce, Pr, Nd, Pm, Sm, Eu, Gd, Tb, Dy, Ho, Er, Tm, Yb and Lu), a second sub component comprising oxides of Mg, a third sub component comprising oxides at least one element M selected from the group consisting of Mn, Cr, Co and Fe, a fourth sub component as a sintering agent, a ratio of the first sub component in terms of oxides ($RO_{3/2}$) is 8 to 20 mol, a ratio of the second sub component in terms of oxides (MgO) is 3 to 15 mol, a ratio of the third sub component in terms of oxides (MO) is 0.6 to 2.0 mol, with respect to 100 mol of said main component; and when a content of the first sub component is R mol, a content of the second sub component is M mol, and a (Continued)

content of the third sub component is N mol with respect to 100 mol of said main component, then $1.0 \leq R/(M+N) < 2.4$ is satisfied.

20 Claims, 2 Drawing Sheets

(51) Int. Cl.
    *H01G 4/12*          (2006.01)
    *C04B 35/626*      (2006.01)
    *C04B 35/64*       (2006.01)
    *H01G 4/30*         (2006.01)
    *H01G 4/005*       (2006.01)

(52) U.S. Cl.
    CPC ........... *H01G 4/005* (2013.01); *H01G 4/1227* (2013.01); *H01G 4/1245* (2013.01); *H01G 4/30* (2013.01); *C04B 2235/3206* (2013.01); *C04B 2235/3208* (2013.01); *C04B 2235/3213* (2013.01); *C04B 2235/3215* (2013.01); *C04B 2235/3222* (2013.01); *C04B 2235/3224* (2013.01); *C04B 2235/3225* (2013.01); *C04B 2235/3236* (2013.01); *C04B 2235/3243* (2013.01); *C04B 2235/3249* (2013.01); *C04B 2235/3268* (2013.01); *C04B 2235/3418* (2013.01); *C04B 2235/656* (2013.01); *C04B 2235/768* (2013.01); *C04B 2235/96* (2013.01)

(56) References Cited

U.S. PATENT DOCUMENTS

2011/0195178 A1\*   8/2011   Kojima ............... C04B 35/4682
                                                427/126.3
2011/0195835 A1\*   8/2011   Kojima ............... C04B 35/4682
                                                501/138

\* cited by examiner

DIELECTRIC CERAMIC COMPOSITION AND MULTILAYER CERAMIC CAPACITOR

BACKGROUND OF THE INVENTION

1. Field of the Invention

The present invention relates to a dielectric ceramic composition, a multilayer ceramic capacitor including a dielectric layer comprising the dielectric ceramic composition, and particularly the present invention relates to the dielectric ceramic composition having good IR characteristic and a high temperature accelerated lifetime.

2. Description of the Related Art

Recently, as the electronic circuit has become highly densified, the electronic component is demanded to be more compact, and the multilayer ceramic capacitor has rapidly become more compact with larger capacity, further the purpose of use has become wider, thus various characteristics are in demand.

For example, the mid-high voltage capacitor which is used at a high rated voltage (for example 100 V or higher) is suitably used for ECM (engine electric computer module), a fuel injection device, an electric controlled throttle, an inverter, a convertor, HID headlamp unit, a battery control unit for a hybrid engine, a digital steel camera or so.

In case of using it at a high rated voltage as mentioned in the above, it is used under high electric field intensity, but if the electric filed intensity becomes higher, the specific permittivity and the insulation resistance or so decreases, hence as a result, the effective capacity or the reliability under the used environment may decrease.

The Patent document 1 discloses the dielectric ceramic composition wherein the compositional formula is $100BaTiO_3+aRE_2O_3+bMnO+cMgO$, and "a", "b", "c" and the ratio thereof are within a specific range. The Patent document 1 discloses that, this dielectric ceramic composition is non-reducible, and exhibits better specific permittivity, insulation property, temperature change rate of the capacitance, and dielectric loss tangent or so.

However, the Patent document 1 does not describe the characteristic and the reliability under a high electric field intensity such as DC voltage application or so, hence it is unknown whether these characteristics are good or not.

PRIOR ART DOCUMENT

Patent document 1: JP Patent Application Laid Open No. H08-31232

SUMMARY OF THE INVENTION

The present invention is attained in view of such circumstances, and the object is to provide the dielectric ceramic composition having good characteristics even under the high electric field intensity, and particularly good IR characteristic and the high temperature accelerated lifetime. Also, the object of the present invention is to provide the multilayer ceramic capacitor comprising the dielectric layer comprising said dielectric ceramic composition.

Means for Attaining the Object

In order to attain the above object, the dielectric ceramic composition according to the present invention comprises, a main component comprising a perovskite type compound shown by a compositional formula $(Ba_{1-x-y}Sr_xCa_y)_m(Ti_{1-z}Zr_z)O_3$ (note that, said "m", "x", "y" and "z" all show a mol ratio, and each satisfies $0.94 \leq m \leq 1.1$, $0 \leq x \leq 0.2$, $0 \leq y \leq 0.2$, $0.06 \leq z < 0.2$), a first sub component comprising oxides of a rare earth element R (note that, R is any one selected from the group consisting of Sc, Y, La, Ce, Pr, Nd, Pm, Sm, Eu, Gd, Tb, Dy, Ho, Er, Tm, Yb and Lu), a second sub component comprising oxides of Mg, a third sub component comprising oxides at least one element M selected from the group consisting of Mn, Cr, Co and Fe, a fourth sub component as a sintering agent, a ratio of the first sub component in terms of oxides ($RO_{3/2}$) is 8 to 20 mol, a ratio of the second sub component in terms of oxides (MgO) is 3 to 15 mol, a ratio of the third sub component in terms of oxides (MO) is 0.6 to 2.0 mol, with respect to 100 mol of said main component; and when a content of the first sub component is R mol, a content of the second sub component is M mol, and a content of the third sub component is N mol with respect to 100 mol of said main component, then $1.0 \leq R/(M+N) < 2.4$ is satisfied.

In the preferable embodiment, "m" in the compositional formula of said main component is preferably $0.95 \leq m < 0.99$, and "z" in the compositional formula of said main component is preferably $0.1 \leq z \leq 0.15$.

In the preferable embodiment, preferably the ratio of the first sub component in terms of oxides is 11 to 20 mol, the ratios of the second sub component in terms of oxides is 6 to 10 mol, and the ratio of the third sub component in terms of oxides is 1.0 to 2.0 mol, with respect to 100 mol of said main component. Also, further preferably, the content of the first sub component of R mol, the content of the second sub component of M mol, and the content of the third sub component of N mol with respect to 100 mol of said main component satisfies $1.6 \leq R/(M+N) \leq 2.2$.

The ratio of the sintering agent as the fourth sub component in terms of oxides with respect to 100 mol of said main component is preferably 2.5 mol or more.

As the electronic component according to the present invention, it is not particularly limited as long as it includes the above mentioned dielectric ceramic composition, and for example a multilayer ceramic capacitor, a piezoelectric element, a chip inductor, a chip varistor, a chip thermister, a chip resistor, and other surface mounting (SMD) chip type electronic component or so may be mentioned. The multilayer ceramic capacitor comprises the dielectric layer including the dielectric ceramic composition of the present invention, and the internal electrode layer.

Effect of the Present Invention

According to the present invention, by setting the content of each component within the above mentioned range, the dielectric ceramic composition having particularly good IR characteristic and high temperature accelerated lifetime can be obtained. Particularly, by setting the composition of the main component and the content of the sub components within a specific range, a good basic characteristic such as the specific permittivity or so can be maintained, and also IR characteristic and the high temperature accelerated lifetime can be improved.

DESCRIPTION OF THE PREFERRED EMBODIMENTS

Hereinafter, the present invention will be described based on the embodiment as shown in the figure.

Multilayer Ceramic Capacitor 1

Figure 1:
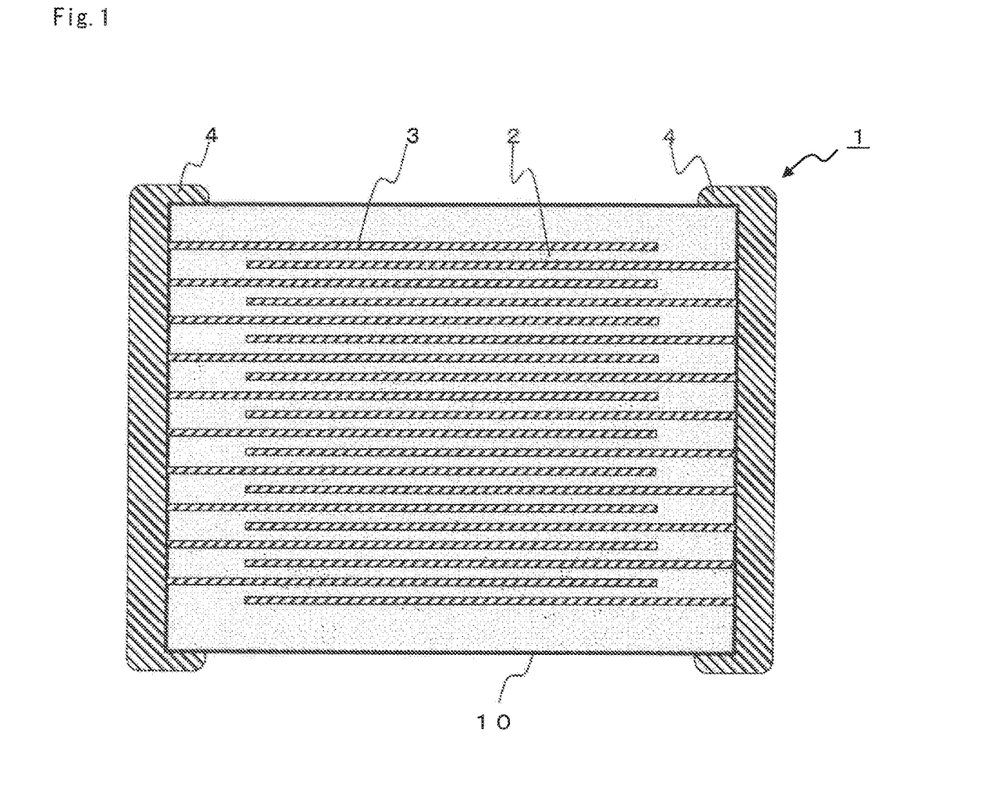
FIG. 1 is the cross section of the multilayer ceramic capacitor according to the first embodiment of the present invention.

As shown in FIG. 1, the multilayer ceramic capacitor 1 as one non-limiting example of the ceramic electronic component comprises the capacitor element main body 10 wherein the dielectric layer 2 and the internal electrode layer 3 are stacked in alternating manner. The internal electrode layer 3 is stacked so that each end faces thereof expose alternatingly to the surface of the two end parts opposing in the capacitor element main body 10. Pair of the external electrodes 4 are formed at the both end parts of the capacitor element main body 10, and are connected to the exposed end face of the internal electrode layer 3 placed alternatingly, thereby the capacitor circuit is formed.

The shape of the capacitor element body 10 is not particularly limited, however as shown in FIG. 1, usually it is rectangular parallelepiped shape. Also, the size thereof is not particularly limited, and the size may be determined appropriately depending on the purpose of use.

Dielectric Layer 2

The dielectric layer 2 is constituted from the dielectric ceramic composition according to the present embodiment. The dielectric ceramic composition includes barium titanate based composite oxides of perovskite type ($ABO_3$) as a main component, and the first to fourth sub components which will be described in below.

The main component is a perovskite type compound which is expressed by a compositional formula of $(Ba_{1-x-y}Sr_xCa_y)_m(Ti_{1-z}Zr_z)O_3$. Here, "m", "x", "y" and "z" all show mol ratio.

In the compositional formula, "m" shows A/B ratio, and it is $0.94 \leq m \leq 1.1$ and preferably $0.95 \leq m < 0.99$. Also, in other preferable embodiment, "m" may be $0.94 \leq m \leq 0.95$, and also it may be $0.99 \leq m \leq 1.1$. If the value "m" of the main component is too small, IR characteristic becomes low due to the over sintering (abnormal crystal growth), and if the value "m" is too large, then the high temperature accelerated lifetime may decline.

In the compositional formula, "x" shows the ratio of Sr in A site, and it is $0 \leq x \leq 0.2$, preferably $0 \leq x \leq 0.1$, more preferably $0 \leq x \leq 0.02$, and it may be 0.

In the compositional formula, "y" shows the ratio of Ca in A site, and it is $0 \leq y \leq 0.2$, preferably $0 \leq y \leq 0.1$, more preferably $0 \leq y \leq 0.02$, and it may be 0.

Also, (x+y) is preferably $0 \leq (x+y) \leq 0.2$, more preferably $0 \leq (x+y) \leq 0.04$, and it may be 0.

If the ratio of Sr and Ca in A site is too large, the high temperature accelerated lifetime may decline.

In the compositional formula, "z" shows the ratio of Zr in B site, and it is preferably $0.06 \leq z < 0.2$, and preferably $0.1 \leq z \leq 0.15$. Also, in other preferable embodiment, "z" may be $0.06 \leq z \leq 0.1$, and it may be $0.15 \leq z \leq 0.2$. By substituting B site with Zr, the bandgap becomes higher, and the resistance can be increased. On the other hand, if Zr is too much, the rare earth element which is the first sub component is interfered from solid dissolving to the main component, and tends to decrease the high temperature accelerated lifetime.

The dielectric ceramic composition comprises the oxide of the rare earth element R as the first sub component. Here, the rare earth element is at least one selected from the group consisting of Sc, Y, La, Ce, Pr, Nd, Pm, Sm, Eu, Gd, Tb, Dy, Ho, Er, Tm, Yb and Lu. Preferably, it is at least one selected from the group consisting of Y, Eu, Gd, Tb, Dy, Ho and Yb. Note that, the oxides of the rare earth element can be used by mixing two or more thereof.

The oxides of the rare earth element R is 8 to 20 mol and preferably 11 to 20 mol with respect to 100 mol of said main component. Also, as other preferable embodiment, it may be 8.0 to 11 mol. Note that, the oxides of the rare earth element is usually shown as $R_2O_3$, but the ratio in terms of oxides in the present embodiment is shown as the mol number based on $RO_{3/2}$. Although it is not to be theoretically limited in any way, a part of the rare earth element R is substituted at A site, and act as the donor which releases electron. The released electron captures the oxygen defect, thus the movement of the oxygen defect during the high temperature accelerated lifetime test is suppressed, and it is thought to enhance the high temperature accelerated lifetime. If the content of the first sub component is too little, the movement of the oxygen defect cannot be suppressed, thus the high temperature accelerated lifetime may decrease. If the first sub component is too much, the IR characteristic may decrease.

The dielectric ceramic composition includes the oxides of Mg as the second sub component. The ratio of the sub component is 3 to 15 mol and preferably 6 to 10 mol in terms of oxides (MgO) with respect to 100 mol of said main component. Also, in the preferable embodiment, it may be 3 to 6 mol, and 10 to 15 mol. If the content of the second sub component is too little, the IR characteristic decreases, and if the content of the second subcomponent is too much, the high temperature accelerated lifetime may decline.

The dielectric ceramic composition includes oxides of at least one element M selected from the group consisting of Mn, Cr, Co and Fe; and preferably it includes MnO, CrO, and particularly preferably it includes MnO as the third sub component. Note that, the oxides of Mn, Cr, Co and Fe may be used by mixing two or more thereof. The ratio of the third sub component is 0.6 to 2.0 mol, and preferably 1.0 to 2.0 mol in terms of oxides (MO), with respect to 100 mol of said main component. Also, in the other preferable embodiment, it may be 0.6 to 1.0 mol. If the content of the third sub component is too large or too small, IR characteristic may deteriorate. Note that, the ratio of the third sub component in terms of oxides shows the mol number based on MnO, CrO, CoO and FeO.

Although it is not to be theoretically limited in any way, part of the metal elements included in the second and third sub component act as the acceptor which substitutes at B site and receives electron, and it is thought to contribute to the improvement of IR characteristic.

Further, in the dielectric ceramic composition of the present invention, when the content of the first sub component is R mol, the content of the second sub component is M mol, and the third sub component is N mol, with respect to 100 mol of said main component, then $1.0 \leq R/(M+N) < 2.4$ is satisfied, and preferably $1.6 \leq R/(M+N) < 2.2$ is satisfied. If the ratio (M+N) is too high, the high temperature accelerated lifetime may be improved, but the IR characteristic tends to decline. Also, if R/(M+N) is too low, then high IR characteristic can be obtained, but the high temperature accelerated lifetime tends to decline. Therefore, by having the content and the ratio of the first to third sub components within the above mentioned ranges, the IR characteristic and the high temperature accelerated lifetime can be improved in a good balance. Also, in other preferable embodiment, it may be $1.0 \leq R/(M+N) < 1.6$, and $2.2 \leq R/(M+N) < 2.4$.

The dielectric ceramic composition further includes the sintering agent as the fourth sub component. The fourth sub component is not particularly limited as long as it contributes to the sintering of the above mentioned main component and the first to third sub components, however usually the oxides of Si, Li, Al, Ge and B are preferably used. The contents of the sintering agent in terms of $SiO_2$, $LiO_{1/2}$, $AlO_{3/2}$, $GeO_2$, or $BO_{3/2}$ are preferably 2.0 mol or more, more preferably 2.5 mol or more, further preferably 2.5 mol to 8.2 mol, with respect to 100 mol of the main component. By having the content of the fourth sub component within this range, the insulation resistance and the high temperature load accelerated lifetime tends to increase. If the content of the sintering agent is too much, the high temperature accelerated lifetime tends to deteriorate. On the other hand, if too little, the sintering property tends to decline. Also, in other preferable embodiment, the content of the fourth embodiment may be more than 0 mol and less than 2.5 mol.

As the fourth sub component, the oxides of Si are preferably used, because it has great effect to improve the characteristics among the above mentioned oxides. As the oxides including Si, it is not particularly limited, and it may be in a form of $SiO_2$ alone, or it may be in a form of composite oxides between Si and other elements such as alkali metal and alkaline earth metal. In the present embodiment, as the oxides including Si, $SiO_2$ is preferable.

By setting the composition of the main component and the content of the sub components within the above mentioned range, the dielectric ceramic composition having particularly good IR characteristic and the high temperature accelerated lifetime can be obtained. Particularly, by setting the composition of the main component and the content of the sub component within the specific range, the basic characteristic such as the specific permittivity or so can be maintained good, and even more the IR characteristic and the high temperature accelerated lifetime can be improved.

The dielectric ceramic composition according to the present embodiment may further comprise other components depending of the desired characteristic. The composition of the dielectric ceramic composition can be verified by Inductively Coupled Plasma (ICP) emission spectrometric analysis.

The thickness of the dielectric layer 2 is not particularly limited, however 0.5 to 20 μm or so per one layer is preferable. The dielectric layer 2 is constituted from the dielectric particles including said dielectric ceramic composition. The average particle diameter (equivalent circle diameter) of the dielectric particle is preferably within the range of 0.2 to 3.0 μm, and more preferably 0.5 to 1.0 μm. The average particle diameter of the dielectric particle can be calculated by processing the microscopic image of the dielectric layer cross section with the image processing software or so. First, the capacitor element main body 10 is cut at the vertical face to the stacking direction of the dielectric layer 2 and the internal electrode layer 3. Then, a chemical etching is carried out to the dielectric layer cross section, then for the arbitrary selected 200 or more of the dielectric particles, the area of the dielectric particles are calculated. The circle equivalent diameter is calculated from this area, and the average particle diameter of the dielectric particle is obtained.

The stacked number of the dielectric layer 2 is not particularly limited, but preferably it is 20 or more, more preferably 50 or more, and particularly preferably 100 or more. The upper limit of the stacking number is not particularly limited, and for example it is 2000 or so.

Internal Electrode Layer 3

The conductive material comprised in the internal electrode layer 3 is not particularly limited, however because the material constituting the dielectric layer 2 is reduction resistant, a relatively inexpensive base metal can be used. As the base metal used as the conductive material, Ni or Ni alloy is preferable. As Ni alloy, the alloy between Ni and an element selected from the group consisting of Mn, Cr, Co and Al is preferable, and preferably the content of Ni in the alloy is 95 wt % or more. Note that, in Ni or Ni alloy, various trace components such P or so may be included by 0.1 wt % or less. The thickness of the internal electrode layer 3 may be determined accordingly based on the purpose of use, however preferably it is 0.1 to 3 μm or so.

External Electrode 4

The conductive material comprised in the external electrode 4 is not particularly limited, but inexpensive Ni, Cu and the alloy thereof can be used in the present embodiment. The thickness of the external electrode 4 can be determined appropriately depending on the purpose of use, but usually it is preferably 10 to 50 μm or so.

The Production Method of the Multilayer Ceramic Capacitor 1

The multilayer ceramic capacitor 1 of the present embodiment is produced as similar to the conventional multilayer ceramic capacitor, that is the green chip is produced by a printing method or sheet method or so using the paste, then firing this, followed by printing or transferring the external electrode and firing, thereby the multilayer ceramic capacitor 1 of the present embodiment is produced. Hereinafter, the non-limiting example of the production method will be explained.

First, the dielectric material for forming the dielectric layer is prepared, then this is made into paste, thereby the dielectric layer paste is prepared.

(Materials)

As the dielectric material, the material of the main component, and the material of each sub components are prepared. As the material thereof, the oxides of the above mentioned component and the mixture thereof, the composite oxides can be used. Also, it can be selected from various compounds which forms the above mentioned oxides and composite oxides by firing, such as carbonate, oxalate, nitrate, hydroxides, organometal compound or so, and also it can be used by mixing these.

As the material of the main component, those made by various methods such as so called solid phase method and various liquid phase methods (for example, an oxalate method, a hydrothermal synthesis method, an alkoxide method and a sol gel method or so) can be used.

Further, in case components other than the above mentioned main component and the sub components are included in the dielectric layer, as the material of such components, as similar to the above, the oxides of these, the mixture and the composite oxide thereof can be used. Also, in addition, the various compounds which become the above mentioned oxides and the composite oxides by firing can be used as well. The content of each components in the dielectric material may be determined so that it satisfies the composition of the above mentioned dielectric ceramic composition after firing.

(The Preparation of the Dielectric Material)

In order to prepare the dielectric material, the material of each component is thoroughly mixed to obtain the mixture powder, then this is heat treated (calcined), and the calcined material is obtained. The mixing of the material is not particularly limited, but it is thoroughly mixed for 20 hours or so by a wet method, then it is dried.

The calcining condition is not particularly limited, however the calcining temperature is 900 to 1350° C., preferably 1000 to 1350° C., the temperature rising rate up to the calcining temperature is 10° C./hour to 2000° C./hour or so, preferably 10° C./hour to 200° C./hour, more preferably 20° C./hour to 150° C./hour, and the temperature holding time is preferably 1 to 10 hours, more preferably 2 to 7 hours, the temperature decreasing rate after holding time at the calcining temperature is 200° C./hour or more, preferably 300° C./hour or more, and more preferably 400° C./hour or more.

The calcined material obtained as such (the material after the reaction) is pulverized if necessary. Then, if necessary, the calcined material and additional material components are mixed, thereby the dielectric material is obtained. Note that, because part of the components may evaporate during calcining, and the composition may change, the addition of the components to the calcined source material may be determined so that the desired composition is satisfied after the firing.

Also, the main component material may be only calcined, and the sub components may be added and mixed, then further carrying out the calcination, thereby the dielectric material may be obtained as well. The calcining condition in such case is as same as mentioned in the above.

(The Preparation of the Green Chip)

Next, the dielectric material is made into a paste, then the dielectric paste is prepared. The dielectric layer paste may be an organic paste kneaded with dielectric material and the organic vehicle, or it may be a water-based paste.

The organic vehicle is obtained by dissolving a binder in an organic solvent. The binder used in the organic vehicle is not particularly limited, and may be properly selected from a variety of usual binders such as ethylcellulose and polyvinyl butyral or so. Also, the organic solvent used is not particularly limited, and may be properly selected from a variety of organic solvents such as terpineol, butyl carbitol, acetone and toluene or so in accordance with a method used such as a printing method and a sheet method or so.

Also, when using water-based dielectric layer paste, dielectric materials can be kneaded with a water-based vehicle obtained by dissolving an aqueous binder and a dispersant or so in water. The aqueous binder used for water-based vehicle is not particularly limited, and for example, polyvinyl alcohol, cellulose, aqueous acrylic resin or so may be used.

An internal electrode layer paste is obtained by kneading conductive materials consisting of the above mentioned various conductive metals and alloys, or various oxides, organic metallic compound and resinate or so, which become the above mentioned conductive materials after firing, with the above mentioned organic vehicle. Also, an inhibitor may be included in the internal electrode layer paste. As the inhibitor, it is not particularly limited, but preferably the inhibitor comprises the same composition as the main component.

An external electrode paste may be obtained as same as the above mentioned internal electrode layer paste.

The content of organic vehicle in each of the above mentioned paste is not particularly limited, and may be an usual content, for example, 1 to 5 wt % or so of the binder and 10 to 50 wt % or so of the solvent. Also, in each paste, the additives may be included which are selected from variety of dispersants, plasticizers, dielectrics, insulators or so, if needed. The total contents of these are preferably 10 wt % or less.

When using the printing method, the dielectric layer paste and the internal electrode layer paste are printed on a substrate such as PET or so to form layers, and after cutting to a predetermined shape, the green chip is obtained by removing from the substrate.

Also, when using the sheet method, a green sheet is formed by using the dielectric layer paste, and the internal electrode layer paste is printed thereon, then these are stacked to form the green chip.

(Binder Removal, Firing, and Annealing)

Before firing, the green chip is subjected to a binder removal treatment. The binder removal conditions are, the temperature rising rate of preferably 5 to 300° C./hour, the holding temperature of preferably 180 to 900° C., and the temperature holding time of preferably 0.5 to 24 hours. Also, the binder removal atmosphere is the air or reduced atmosphere.

After the binder removal, the firing of the green chip is carried out. The atmosphere when firing the green chip can be suitably determined depending on the type of the conductive material in the internal electrode paste. However when using base metal such as Ni or Ni alloy as the conductive material, the oxygen partial pressure of the firing atmosphere is preferably $10^{-14}$ to $10^{-10}$ MPa. If the oxygen partial pressure is below said range, the conductive material of the internal electrode layer may have abnormal sintering which results in a breakage thereof. Also, if the oxygen partial pressure exceeds said range, the internal electrode layer tends to oxidize.

The holding temperature at the firing is preferably 1000 to 1400° C., and more preferably 1100 to 1360° C. If the holding temperature is below said range, the densification becomes insufficient; and if it exceeds said range, the breakage of the electrode due to the abnormal sinter of the internal electrode layer, the deterioration of the capacitance-temperature characteristics tend to occur due to the dispersion of the constitution material of the internal electrode layer, or a reduction of the dielectric ceramic composition tend to occur.

As for the other firing conditions, the temperature rising rate is preferably 50 to 2000° C./hour, and more preferably 200 to 300° C./hour; the temperature holding time is preferably 0.5 to 8 hours, and more preferably 1 to 3 hours; and the cooling rate is preferably 50 to 2000° C./hour, and more preferably 200 to 300° C./hour. Also, the firing atmosphere is preferably a reduced atmosphere. As for the atmospheric gas, for example, wet mixed gas of $N_2$ and $H_2$ may be used.

After firing in a reducing atmosphere, it is preferable to anneal the capacitor element body. The annealing is a treatment for reoxidizing the dielectric layer and can make the lifetime significantly longer, thereby the reliability is improved.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

The holding temperature at annealing is preferably 1100° C. or less, particularly preferably 500 to 1100° C. When the holding temperature is below the above range, the dielectric layer may not be sufficiently oxidized, which tends to result in low insulation resistance and short high temperature accelerated lifetime. On the other hand, when the holding temperature exceeds the above range, not only the internal electrode layer is oxidized to reduce the capacitance, but also the internal electrode layer reacts with the dielectric element itself, which may tend to cause deteriorated capacitance-temperature characteristics, lowered insulation resistance, and lowered high temperature accelerated lifetime. Note that the annealing may consist of a temperature rising step and temperature decreasing step. That is, the temperature holding time may be zero. In this case, the holding temperature is same as the maximum temperature.

Additional annealing conditions include: the temperature holding time of preferably 0 to 20 hours, more preferably 2 to 10 hours; and the cooling rate of preferably 50 to 500° C./hour, more preferably 100 to 300° C./hour. Also, the atmosphere gas at annealing is preferably $N_2$ or $N_2+H_2O$ gas or so, for example.

Also, the binder removal treatment, the firing and the annealing may be performed continuously or independently.

Thus obtained capacitor element body is then carried out with an end surface polishing, for example, by a barrel polishing or a sand blasting, and the external electrode paste is pasted thereon, followed by firing, so that the external electrode 4 is formed. If needed, a covering layer may be formed on the surface of the external electrode 4 by plating or so.

Thus produced multilayer ceramic capacitor of the present embodiment is mounted on the printed-circuit board or so by soldering or so, to be used in a variety of electronic devices or so.

Hereinabove, an embodiment of the present invention is described, but the present invention is not to be limited to the above-mentioned embodiments and can be variously modified within the scope of the present invention.

For example, in the above-mentioned embodiment, a multilayer ceramic capacitor is exemplified as an electronic component according to the present invention. However, the electronic component according to the present invention is not limited to the multilayer ceramic capacitor and may be any comprising the dielectric layer having the above composition.

As discussed in above, the electronic component according to the present invention has excellent IR characteristic and the high temperature accelerated lifetime, thus it is particularly suited as the multilayer ceramic capacitor for mid-high voltage having high rated voltage (for example 100 V or higher).

EXAMPLE

Hereinafter, the present invention will be described based on the further detailed examples, but the present invention is not limited to the examples.
(Preparation of the Dielectric Materials)

As the main component material, barium carbonate ($BaCO_3$), calcium carbonate ($CaCO_3$), strontium carbonate ($SrCO_3$), titanium oxide ($TiO_2$) and zirconium oxide ($ZrO_2$) were prepared. Further, rare earth oxides as the first sub component material, magnesium oxide (MgO) as the second sub component material, oxides of Mn and Cr as the third sub component material, and oxides of Si and Al as the fourth sub component material were prepared.

Said main component and sub components were weighted so that the composition after the firing satisfies the composition shown in Table 1. After weighing each material, these were mixed. The mixing was carried out for 20 hours by a ball mill using wet mix stirring. The compound obtained after the wet mix stirring was dehydrated and dried. After being dehydrated and dried, the temperature was raised to room temperature to 1100° C. at the rate of 100° C./hour, then calcined for 5 hours at 1100° C., then pulverized if necessary, thereby the powder of the calcined materials (the dielectric materials) was obtained.
(Preparation of the Dielectric Layer Paste)

Next, the obtained dielectric material: 100 parts by weight, polyvinyl butyral resin: 10 parts by weight, dioctyl phthalate (DOP) as a plasticizer: 5 parts by weight, and alcohol as a solvent: 100 parts by weight were mixed by a ball mill to form a paste, thereby a dielectric layer paste was obtained.
(Preparation of the Internal Electrode Layer Paste)

Also, aside from the above, Ni particles: 44.6 parts by weight, terpineol: 52 parts by weight, ethyl cellulose: 3 parts by weight and benzotriazole: 0.4 parts by weight were kneaded by triple rolls, thereby an internal electrode layer paste was obtained.
(Preparation of the Green Chip)

Then, by using the above obtained dielectric layer paste, on a PET film, a green sheet was formed so that the thickness after drying was 15 μm. Next, by using the internal electrode layer paste, an electrode layer was printed in a predetermined pattern thereon, followed by removing the sheet from the PET film, thereby the green sheet with the electrode layer was obtained. A plurality of green sheets with the electrode layer were stacked and adhered by pressure to obtain a green multilayer body. The green multilayer body was cut into a predetermined size to obtain a green chip.
(Preparation of the Multilayer Ceramic Capacitor)

Then, the obtained green chip was subjected to the binder removal treatment, the firing and the annealing in the following conditions, to obtain a multilayer ceramic sintered body.

The binder removal treatment was performed under the condition of the temperature rising rate: 25° C./hour, the holding temperature: 260° C., the temperature holding time: 8 hours, and the atmosphere: in the air.

The firing condition was performed at the temperature rising rate: 200° C./hour, the holding temperature: 1200 to 1300° C., the temperature holding time: 2 hours, the temperature decreasing rate: 200° C./hour. Note that, the atmosphere gas was wet mixed gas of $N_2+H_2$, and the oxygen partial pressure was $10^{-13}$ MPa.

The annealing was performed at the temperature rising rate: 200° C./hour, the holding temperature: 1050° C., the temperature holding time: 2 hours, the temperature decreasing rate: 200° C./hour, and the atmosphere gas: wet gas of $N_2$ (the oxygen partial pressure: $10^{-6}$ MPa).

Note that a wetter was used to wet the atmosphere gas during the firing and annealing.

After polishing end faces of the obtained sintered body with sandblast, In—Ga alloy was coated as an external electrode to obtain a sample of the multilayer ceramic capacitor shown in FIG. 1. The size of the obtained capacitor sample was 3.2 mm×1.6 mm×0.6 mm, the thickness of the dielectric layer was 10 μm, the thickness of the internal electrode layer was 1.0 μm, and the number of the dielectric layers sandwiched by the internal electrode layers was S.

The obtained capacitor samples were subjected to the insulation resistance (IR) and the high temperature accelerated lifetime (MTTF) measurements in accordance with the method shown in below.

Insulation Resistance (IR)

Using an insulation resistance meter (R8340A by Advantest), the insulation resistance IR of after applying DC voltage of 500V at 25° C. for 10 seconds to the capacitor, then leaving for 50 second after the voltage application was measured. In the present example, $5.0 \times 10^{11} \Omega$ or more was defined good (A), $2.0 \times 10^{12} \Omega$ or more was defined excellent (S), and less than $5.0 \times 10^{11} \Omega$ was defined poor (F).

High Temperature Accelerated Lifetime (MTTF)

The DC voltage was kept applied to the capacitor sample under the electric field of 60V/μm at 200° C., then by measuring the insulation deterioration time of the capacitor sample, the high temperature accelerated lifetime was evaluated. In the present example, the lifetime is defined as the time which took for the insulation resistance to drop by one digit from the start of the voltage application. Also, the above mentioned evaluation was carried out to 10 capacitor samples, then the mean time to failure was calculated by carrying out the weibull analysis, then this mean time to failure was defined as the high temperature accelerated lifetime of the sample. In the present example, 20 hours or longer was defined good (A), 40 hours or longer was defined as excellent (S), and less than 20 hours was defined failure (F).

The results are shown in following Table. In the table, "*" mark represents the sample which is out of the range of the claim 1, and the value shown in italicized font shows the value which is out of the range of the claim 1. The content of the sub components refers to the content in terms of predetermined oxides. Also, in case plurality of components is used, it is shown alongside, and the content thereof is also shown. For example, (Si, Al) (1.6, 0.6) mean that 1.6 mol of Si oxides and 0.6 mol of Al oxides were used together.

Figure 2:
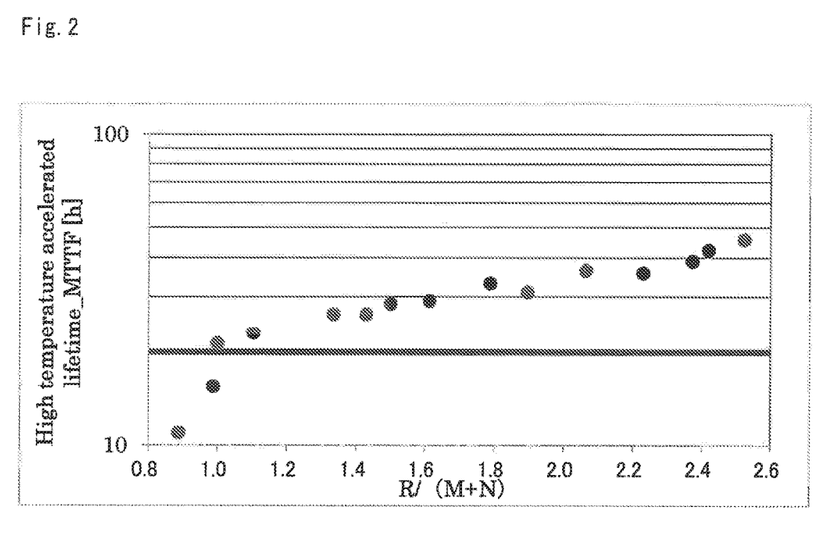
FIG. 2 shows the relation between the high temperature accelerated lifetime (MTTF) of the samples 25 to 39 of the examples and the ratio R/(M+N).
Figure 3:
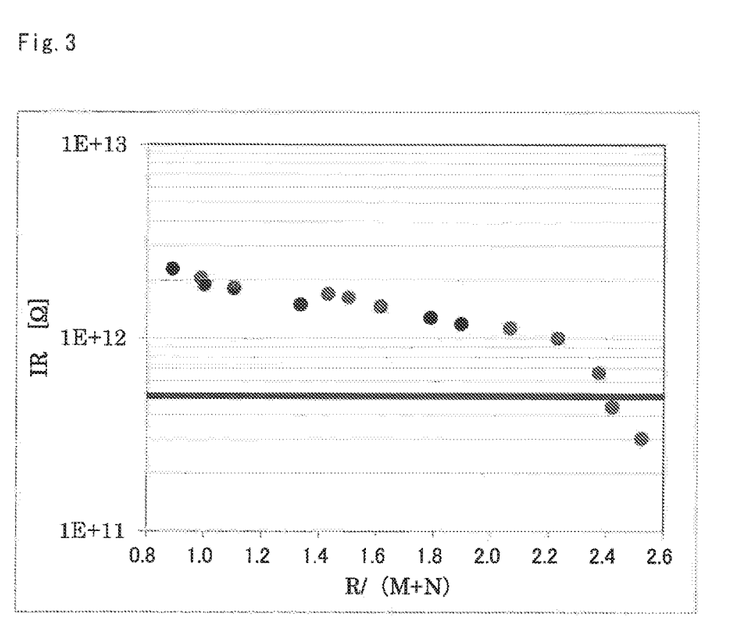
FIG. 3 shows the relation between the IR characteristic of the samples 25 to 39 of the examples and the ratio R/(M+N).

For the samples 25 to 39, the relation between the high temperature accelerated lifetime (MTTF) and the ratio R/(M+N) are shown in FIG. 2, and the relation between the IR characteristic and the ratio R/(M+N) are shown in FIG. 3.

TABLE 1

| | Sample No. | $(Ba_{1-x-y}Sr_xCa_y)_m(Ti_{1-z}Zr_z)O_3$ | | | | First sub component $RO_{3/2}$ [mol %] | | Second sub compoennt MgO [mol %] | | Third sub component MO [mol %] | |
|---|---|---|---|---|---|---|---|---|---|---|---|
| | | m | x | y | z | Elelment | Total R | Elelment | M | Elelment | N |
| ※ | 1 | *0.93* | 0 | 0.01 | 0.08 | Ho | 9 | 9 | Mg | 5.0 | Mn | 0.9 |
| | 2 | 0.94 | 0 | 0 | 0.07 | Tb | 8 | 8 | Mg | 5.6 | Mn | 0.7 |
| | 3 | 1.10 | 0 | 0.02 | 0.09 | Tb | 8 | 8 | Mg | 5.8 | Cr | 0.9 |
| ※ | 4 | *1.11* | 0.01 | 0 | 0.09 | Tb | 8 | 8 | Mg | 5.8 | Mn | 0.8 |
| | 5 | 1.00 | 0.2 | 0.01 | 0.08 | Eu | 8 | 8 | Mg | 5.5 | Mn | 0.7 |
| ※ | 6 | 1.00 | *0.22* | 0.02 | 0.08 | Gd | 9 | 9 | Mg | 5.7 | Mn | 0.7 |
| | 7 | 1.00 | 0 | 0.2 | 0.08 | Gd | 9 | 9 | Mg | 4.9 | Cr | 0.8 |
| ※ | 8 | 1.00 | 0 | *0.22* | 0.09 | Tb | 8.8 | 8.8 | Mg | 5.0 | Mn | 0.7 |
| ※ | 9 | 1.00 | 0.02 | 0.01 | *0.05* | Eu | 9.6 | 9.6 | Mg | 5.5 | Mn | 0.7 |
| | 10 | 1.00 | 0.02 | 0 | 0.06 | Tb | 8.2 | 8.2 | Mg | 6.3 | Mn | 0.8 |
| | 11 | 1.00 | 0 | 0.02 | 0.19 | GdTb | 6.3 | 9 | Mg | 6.0 | Cr | 0.8 |
| ※ | 12 | 1.00 | 0 | 0.01 | *0.2* | Gd | 8.6 | 8.6 | Mg | 6.0 | Cr | 0.8 |
| ※ | 13 | 1.00 | 0 | 0 | 0.08 | Gd | 7.6 | *7.6* | Mg | 4.0 | Mn | 0.7 |
| | 14 | 1.00 | 0 | 0 | 0.07 | Gd | 8 | 8 | Mg | 3.3 | Mn | 0.9 |
| | 15 | 1.00 | 0 | 0.01 | 0.08 | Gd | 20 | 20 | Mg | 10.0 | Mn | 0.8 |
| ※ | 16 | 1.00 | 0 | 0.02 | 0.08 | Gd | 21 | *21* | Mg | 9.0 | Mn | 0.7 |
| ※ | 17 | 1.00 | 0.01 | 0 | 0.09 | GdDy | 6.6, 2.4 | 9 | Mg | *2.8* | Mn | 0.7 |
| | 18 | 1.00 | 0.01 | 0 | 0.08 | Gd | 9 | 9 | Mg | 3.0 | Mn | 0.8 |
| | 19 | 1.00 | 0.01 | 0.01 | 0.09 | Gd | 16 | 16 | Mg | 15.0 | Mn | 0.8 |
| ※ | 20 | 1.00 | 0 | 0.02 | 0.07 | Gd | 8 | 8 | Mg | *16.0* | Mn | 0.8 |
| ※ | 21 | 1.00 | 0 | 0 | 0.08 | Dy | 9 | 9 | Mg | 6.3 | Mn | *0.5* |
| | 22 | 1.00 | 0 | 0 | 0.08 | Gd | 9.6 | 9.6 | Mg | 8.0 | Mn | 0.8 |
| | 23 | 1.00 | 0.01 | 0.02 | 0.07 | Y | 9.6 | 9.6 | Mg | 7.0 | Mn | 2.0 |
| ※ | 24 | 1.00 | 0 | 0.02 | 0.09 | Y | 9.4 | 9.4 | Mg | 7.0 | Mn | *2.1* |
| ※ | 25 | 1.00 | 0.01 | 0.01 | 0.08 | Gd | 8 | 8 | Mg | 8.1 | Cr | 0.9 |
| ※ | 26 | 1.00 | 0 | 0 | 0.09 | Gd | 8 | 8 | Mg | 7.4 | Mn | 0.7 |
| | 27 | 1.00 | 0 | 0 | 0.09 | Gd | 8.8 | 8.8 | Mg | 8.1 | Mn | 0.7 |
| | 28 | 1.00 | 0.02 | 0 | 0.09 | Gd | 9.6 | 9.6 | Mg | 7.8 | Cr | 0.9 |
| | 29 | 1.00 | 0 | 0 | 0.08 | Gd | 10 | 10 | Mg | 6.7 | Mn | 0.8 |
| | 30 | 1.00 | 0 | 0.01 | 0.07 | Gd | 10 | 10 | Mg | 6.3 | Mn | 0.7 |
| | 31 | 1.00 | 0.03 | 0 | 0.08 | GdHo | 10, 0.8 | 10.8 | Mg | 6.4 | Cr | 0.8 |
| | 32 | 1.00 | 0 | 0 | 0.07 | Gd | 10 | 10 | Mg | 5.4 | Mn | 0.8 |
| | 33 | 1.00 | 0.02 | 0.01 | 0.08 | Tb | 11.8 | 11.8 | Mg | 5.9 | Mn | 0.7 |
| | 34 | 1.00 | 0.02 | 0 | 0.08 | Gd | 10.8 | 10.8 | Mg | 6.0 | Mn | 0.7 |
| | 35 | 1.00 | 0 | 0.01 | 0.08 | Dy | 13 | 13 | Mg | 5.7 | Mn | 0.8 |
| | 36 | 1.00 | 0.02 | 0 | 0.08 | Gd | 13.6 | 13.6 | Mg | 5.4 | Mn | 0.7 |
| | 37 | 1.00 | 0 | 0 | 0.09 | Gd | 10.2 | 10.2 | Mg | 3.5 | Mn | 0.8 |
| ※ | 38 | 1.00 | 0.01 | 0.02 | 0.09 | Gd | 10.4 | 10.4 | Mg | 3.5 | Mn | 0.8 |
| ※ | 39 | 1.00 | 0.01 | 0.02 | 0.08 | Gd | 10.6 | 10.6 | Mg | 3.5 | Cr | 0.7 |
| | 40 | 0.94 | 0 | 0 | 0.08 | Gd | 10 | 10 | Mg | 6.0 | Mn | 0.8 |
| | 41 | 0.95 | 0 | 0 | 0.08 | Gd | 10 | 10 | Mg | 6.0 | Mn | 0.8 |
| | 42 | 0.97 | 0 | 0 | 0.08 | Gd | 10 | 10 | Mg | 6.0 | Mn | 0.8 |
| | 43 | 0.98 | 0 | 0 | 0.08 | Gd | 10 | 10 | Mg | 6.0 | Mn | 0.8 |
| | 44 | 0.99 | 0 | 0 | 0.08 | Gd | 10 | 10 | Mg | 6.0 | Mn | 0.8 |

TABLE 1-continued

| | | | | | | | | | | | |
|---|---|---|---|---|---|---|---|---|---|---|---|
| 45 | 0.97 | 0 | 0 | 0.13 | Gd | 14 | 14 | Mg | 8.0 | Mn | 1.3 |
| 46 | 0.97 | 0 | 0 | 0.15 | Gd | 10 | 10 | Mg | 6.0 | Mn | 0.8 |
| 47 | 0.97 | 0 | 0 | 0.17 | Gd | 10 | 10 | Mg | 6.0 | Mn | 0.8 |
| 48 | 0.97 | 0 | 0 | 0.13 | Gd | 14.4 | 14.4 | Mg | 7.7 | Mn | 1.3 |
| 49 | 0.97 | 0 | 0 | 0.13 | Gd | 16 | 16 | Mg | 7.3 | Mn | 1.3 |
| 50 | 0.97 | 0 | 0 | 0.13 | Gd | 16 | 16 | Mg | 7.3 | Mn | 1.3 |
| 51 | 0.97 | 0 | 0 | 0.13 | Gd | 17.8 | 17.8 | Mg | 6.5 | Mn | 1.6 |
| 52 | 0.97 | 0 | 0 | 0.13 | Gd | 19 | 19 | Mg | 6.5 | Mn | 1.4 |
| 53 | 0.97 | 0 | 0 | 0.13 | Gd | 11.8 | 11.8 | Mg | 6.0 | Mn | 1.3 |
| 54 | 0.97 | 0 | 0 | 0.13 | Gd | 14 | 14 | Mg | 10.0 | Mn | 1.3 |
| 55 | 0.97 | 0 | 0 | 0.13 | Gd | 11 | 11 | Mg | 8.0 | Mn | 1.3 |
| 56 | 0.97 | 0 | 0 | 0.13 | Gd | 20 | 20 | Mg | 7.0 | Mn | 1.3 |
| 57 | 0.97 | 0 | 0 | 0.13 | Gd | 11.6 | 11.6 | Mg | 7.0 | Mn | 1.0 |
| 58 | 0.97 | 0 | 0 | 0.13 | Gd | 14 | 14 | Mg | 7.0 | Mn | 2.0 |
| 59 | 0.97 | 0 | 0 | 0.13 | Gd | 16 | 16 | Mg | 7.3 | Mn | 1.3 |
| 60 | 0.97 | 0 | 0 | 0.13 | Gd | 16 | 16 | Mg | 7.3 | Mn | 1.3 |
| 61 | 0.97 | 0 | 0 | 0.13 | Gd | 16 | 16 | Mg | 7.3 | Mn | 1.3 |
| 62 | 0.97 | 0 | 0 | 0.13 | Gd | 18 | 16 | Mg | 7.3 | Mn | 1.3 |

| | Sample No. | Sintering agent Element | Sintering agent content [mol %] | R/(M + N) | IR[Ω] 500 V, 1 min Measured value | IR[Ω] 500 V, 1 min Evaluation | High temperature accelerated lifetime (MTTF)[h] 200° C., 60 V/um Measured value | High temperature accelerated lifetime (MTTF)[h] 200° C., 60 V/um Evaluation |
|---|---|---|---|---|---|---|---|---|
| ※ | 1 | Si | 2.3 | 1.53 | 8.5E+09 | F | unable to measure | F |
|   | 2 | Si | 2.3 | 1.29 | 5.2E+11 | A | 38.5 | A |
|   | 3 | Si | 2.4 | 1.19 | 1.9E+12 | A | 20.2 | A |
| ※ | 4 | Si, Al | 1.6, 0.6 | 1.21 | 2.2E+12 | S | 9.4 | F |
|   | 5 | Si | 2.3 | 1.29 | 5.3E+11 | A | 22.4 | A |
| ※ | 6 | Si, Al | 1.3, 0.9 | 1.41 | 8.5E+10 | F | 12.8 | F |
|   | 7 | Si | 2.2 | 1.58 | 1.6E+12 | A | 20.4 | A |
| ※ | 8 | Si | 2.4 | 1.54 | 1.3E+12 | A | 7.2 | F |
| ※ | 9 | Si | 2.4 | 1.55 | 3.9E+11 | F | 40.2 | S |
|   | 10 | Si | 2.3 | 1.15 | 5.8E+11 | A | 35.5 | A |
|   | 11 | Si, Al | 1.3, 0.9 | 1.32 | 1.8E+12 | A | 20.4 | A |
| ※ | 12 | Si | 2.4 | 1.26 | 1.8E+12 | A | 11 | F |
| ※ | 13 | Si | 2.4 | 1.62 | 2.0E+12 | S | 17.6 | F |
|   | 14 | Si | 2.4 | 1.90 | 1.8E+12 | A | 20.2 | A |
|   | 15 | Si | 2.3 | 1.85 | 5.4E+11 | A | 39.4 | A |
| ※ | 16 | Si | 2.2 | 2.16 | 3.4E+11 | F | 44.2 | S |
| ※ | 17 | Si | 2.2 | 2.57 | 4.0E+10 | F | 42.2 | S |
|   | 18 | Si | 2.2 | 2.37 | 6.1E+11 | A | 38 | A |
|   | 19 | Si | 2.3 | 1.01 | 1.8E+12 | A | 20.1 | A |
| ※ | 20 | Si | 2.2 | 0.48 | 2.1E+12 | S | 5.3 | F |
| ※ | 21 | Si | 2.3 | 1.32 | 2.3E+09 | F | 20 | A |
|   | 22 | Si | 2.4 | 1.45 | 5.0E+11 | A | 25.5 | A |
|   | 23 | Si | 2.4 | 1.07 | 5.1E+11 | A | 35.2 | A |
| ※ | 24 | Si | 2.4 | 1.03 | 4.0E+11 | F | 33.2 | A |
| ※ | 25 | Si | 2.3 | 0.89 | 2.3E+12 | S | 11 | F |
| ※ | 26 | Si | 2.3 | 0.99 | 2.1E+12 | S | 15.5 | F |
|   | 27 | Si | 2.3 | 1.00 | 1.8E+12 | A | 21.4 | A |
|   | 28 | Si | 2.4 | 1.10 | 1.8E+12 | A | 23.1 | A |
|   | 29 | Si | 2.4 | 1.33 | 1.5E+12 | A | 26.4 | A |
|   | 30 | Si, Al | 0.8, 1.6 | 1.43 | 1.7E+12 | A | 28.4 | A |
|   | 31 | Si | 2.4 | 1.50 | 1.6E+12 | A | 28.5 | A |
|   | 32 | Si, Al | 2.0, 0.3 | 1.61 | 1.5E+12 | A | 29.1 | A |
|   | 33 | Si | 2.3 | 1.79 | 1.3E+12 | A | 33.1 | A |
|   | 34 | Si | 2.3 | 1.89 | 1.2E+12 | A | 31.1 | A |
|   | 35 | Si | 2.4 | 2.06 | 1.1E+12 | A | 36.4 | A |
|   | 36 | Si | 2.3 | 2.23 | 1.0E+12 | A | 35.7 | A |
|   | 37 | Si, Al | 1.2, 1.2 | 2.37 | 6.7E+11 | A | 38.9 | A |
| ※ | 38 | Si | 2.4 | 2.42 | 4.4E+11 | F | 42.2 | S |
| ※ | 39 | Si, Al | 1.2, 1.1 | 2.52 | 3.0E+11 | F | 45.8 | S |
|   | 40 | Si | 2.3 | 1.47 | 1.9E+12 | A | 56.4 | S |
|   | 41 | Si | 2.3 | 1.47 | 2.1E+12 | S | 49.9 | S |
|   | 42 | Si | 2.3 | 1.47 | 2.2E+12 | S | 48.2 | S |
|   | 43 | Si | 2.3 | 1.47 | 2.4E+12 | S | 40.1 | S |
|   | 44 | Si | 2.3 | 1.47 | 2.5E+12 | S | 33.8 | A |
|   | 45 | Si | 2.3 | 1.51 | 3.4E+12 | S | 73.3 | S |
|   | 46 | Si | 2.3 | 1.47 | 2.8E+12 | S | 52.1 | S |
|   | 47 | Si | 2.3 | 1.47 | 2.9E+12 | S | 42.1 | S |
|   | 48 | Si | 2.3 | 1.60 | 3.3E+12 | S | 80.1 | S |
|   | 49 | Si | 2.3 | 1.85 | 3.1E+12 | S | 85 | S |
|   | 50 | Si | 2.6 | 1.85 | 3.5E+12 | S | 90.1 | S |
|   | 51 | Si | 2.3 | 2.20 | 3.1E+12 | S | 88.3 | S |
|   | 52 | Si | 2.3 | 2.40 | 2.9E+12 | S | 92.5 | S |

TABLE 1-continued

| | | | | | | | |
|---|---|---|---|---|---|---|---|
| 53 | Si | 2.3 | 1.59 | 2.6E+12 | S | 79.8 | S |
| 54 | Si | 2.3 | 1.24 | 3.7E+12 | S | 71.7 | S |
| 55 | Si | 2.3 | 1.19 | 3.6E+12 | S | 70.1 | S |
| 56 | Si | 2.3 | 2.40 | 2.8E+12 | S | 85.5 | S |
| 57 | Si | 2.3 | 1.45 | 2.8E+12 | S | 70.9 | S |
| 58 | Si | 2.3 | 1.56 | 2.7E+12 | S | 83.5 | S |
| 59 | Si | 2.5 | 1.86 | 3.5E+12 | S | 91 | S |
| 60 | Si | 3.5 | 1.86 | 3.8E+12 | S | 99.3 | S |
| 61 | Si | 8.0 | 1.86 | 3.1E+12 | S | 92.2 | S |
| 62 | Si | 8.2 | 1.86 | 2.8E+13 | S | 84.4 | S |

According to the samples 25 to 39, FIG. 2 and FIG. 3, it can be understood that when R/(M+N) is high, the high temperature accelerated lifetime improves and IR characteristic tends to decline. If R/(M+N) is low, high IR can be obtained, but the high temperature accelerated lifetime tends to decline. According to the result, within the range of $1.0 \leq R/(M+N) < 2.4$, high IR characteristic and excellent high temperature accelerated lifetime can be both obtained.

According to the samples 1 to 4, when the value "m" of the main component is small, the IR characteristic is lowered due to the over sintering (abnormal particle growth), on the other hand, if the value "m" is large, the sub components does not solid dissolve hence the high temperature accelerated lifetime is low.

According to the samples 9 to 12, by substituting Ti site with Zr ($BaTiO_3 \rightarrow BaTi_{1-z}Zr_zO_3$), the bandgap becomes high, thereby the resistance can be increased. On the other hand, if Zr is too much, the solid dissolving of the rare earth element to the main component is interfered, hence the high temperature accelerated lifetime declines.

According to the samples 13 to 16, when the content of the first sub component is low, the movement of oxygen defect cannot be suppressed, thereby the high temperature accelerated lifetime declines, on the other hand if the content of the first sub component is too much, IR characteristic tends to decline.

According to the samples 17 to 20, when the content of the second sub component is too small, IR characteristic declines, and on the other hand, if the content of the second sub component is too much, the high temperature accelerated lifetime tends to decline.

According to the samples 21 to 24, when the content of the third sub component is too low or even if it is too much, the IR characteristic is deteriorated.

According to the samples 49 and 59 to 62, the amount of the sintering agent is preferably 2.5 mol or more.

NUMERICAL REFERENCES

1 . . . Multilayer ceramic capacitor
2 . . . Dielectric layer
3 . . . Internal electrode layer
4 . . . External electrode layer
10 . . . Capacitor element body

The invention claimed is:
1. A dielectric ceramic composition comprising,
a main component comprising a perovskite type compound shown by a compositional formula $(Ba_{1-x-y}Sr_xCa_y)_m(Ti_{1-z}Zr_z)O_3$ (note that, said "m", "x", "y" and "z" all show a mol ratio, and each satisfies $0.94 \leq m \leq 1.1$, $0 \leq x \leq 0.2$, $0 \leq y \leq 0.2$, $0.06 \leq z < 0.2$),
a first sub component comprising oxides of a rare earth element R (note that, R is any one selected from the group consisting of Sc, Y, La, Ce, Pr, Nd, Pm, Sm, Eu, Gd, Tb, Dy, Ho, Er, Tm, Yb and Lu),
a second sub component comprising oxides of Mg,
a third sub component comprising oxides at least one element M selected from the group consisting of Mn, Cr, Co and Fe,
a fourth sub component as a sintering agent,
a ratio of the first sub component in terms of oxides ($RO_{3/2}$) is 8 to 20 mol, a ratio of the second sub component in terms of oxides (MgO) is 3 to 15 mol, a ratio of the third sub component in terms of oxides (MO) is 0.6 to 2.0 mol, with respect to 100 mol of said main component; and
when a content of the first sub component is R mol, a content of the second sub component is M mol, and a content of the third sub component is N mol with respect to 100 mol of said main component, then $1.0 \leq R/(M+N) < 2.4$ is satisfied.

2. The dielectric ceramic composition as set forth in claim 1, wherein "m" in the compositional formula of said main component is $0.95 \leq m < 0.99$.

3. The dielectric ceramic composition as set forth in claim 1, wherein "z" in the compositional formula of said main component is $0.1 \leq z \leq 0.15$.

4. The dielectric ceramic composition as set forth in claim 2, wherein "z" in the compositional formula of said main component is $0.1 \leq z \leq 0.15$.

5. The dielectric ceramic composition as set forth in claim 1, wherein the ratio of the first sub component in terms of oxides is 11 to 20 mol, the ratios of the second sub component in terms of oxides is 6 to 10 mol, and the ratio of the third sub component in terms of oxides is 1.0 to 2.0 mol, with respect to 100 mol of said main component.

6. The dielectric ceramic composition as set forth in claim 2, wherein the ratio of the first sub component in terms of oxides is 11 to 20 mol, the ratios of the second sub component in terms of oxides is 6 to 10 mol, and the ratio of the third sub component in terms of oxides is 1.0 to 2.0 mol, with respect to 100 mol of said main component.

7. The dielectric ceramic composition as set forth in claim 3, wherein the ratio of the first sub component in terms of oxides is 11 to 20 mol, the ratios of the second sub component in terms of oxides is 6 to 10 mol, and the ratio of the third sub component in terms of oxides is 1.0 to 2.0 mol, with respect to 100 mol of said main component.

8. The dielectric ceramic composition as set forth in claim 4, wherein the ratio of the first sub component in terms of oxides is 11 to 20 mol, the ratios of the second sub component in terms of oxides is 6 to 10 mol, and the ratio of the third sub component in terms of oxides is 1.0 to 2.0 mol, with respect to 100 mol of said main component.

9. The dielectric ceramic composition as set forth in claim 1, wherein the content of the first sub component of R mol, the content of the second sub component of M mol, and the content of the third sub component of N mol with respect to 100 mol of said main component satisfies 1.6≤R/(M+N)≤2.2.

10. The dielectric ceramic composition as set forth in claim 2, wherein the content of the first sub component of R mol, the content of the second sub component of M mol, and the content of the third sub component of N mol with respect to 100 mol of said main component satisfies 1.6≤R/(M+N)≤2.2.

11. The dielectric ceramic composition as set forth in claim 3, wherein the content of the first sub component of R mol, the content of the second sub component of M mol, and the content of the third sub component of N mol with respect to 100 mol of said main component satisfies 1.6≤R/(M+N)≤2.2.

12. The dielectric ceramic composition as set forth in claim 4, wherein the content of the first sub component of R mol, the content of the second sub component of M mol, and the content of the third sub component of N mol with respect to 100 mol of said main component satisfies 1.6≤R/(M+N)≤2.2.

13. The dielectric ceramic composition as set forth in claim 5, wherein the content of the first sub component of R mol, the content of the second sub component of M mol, and the content of the third sub component of N mol with respect to 100 mol of said main component satisfies 1.6≤R/(M+N)≤2.2.

14. The dielectric ceramic composition as set forth in claim 6, wherein the content of the first sub component of R mol, the content of the second sub component of M mol, and the content of the third sub component of N mol with respect to 100 mol of said main component satisfies 1.6≤R/(M+N)≤2.2.

15. The dielectric ceramic composition as set forth in claim 7, wherein the content of the first sub component of R mol, the content of the second sub component of M mol, and the content of the third sub component of N mol with respect to 100 mol of said main component satisfies 1.6≤R/(M+N)≤2.2.

16. The dielectric ceramic composition as set forth in claim 8, wherein the content of the first sub component of R mol, the content of the second sub component of M mol, and the content of the third sub component of N mol with respect to 100 mol of said main component satisfies 1.6≤R/(M+N)≤2.2.

17. The dielectric ceramic composition as set forth in claim 1, wherein the ratio of the fourth sub component in terms of oxides with respect to 100 mol of said main component is 2.5 mol or more.

18. An electronic component including the dielectric ceramic composition as set forth in claim 1.

19. A multilayer ceramic capacitor comprising a dielectric layer including the dielectric ceramic composition as set forth in claim 1, and an internal electrode.

20. The dielectric ceramic composition as set forth in claim 1, wherein 0≤x≤0.1.

* * * * *